United States Patent [19]

Welschof et al.

[11] Patent Number: 4,840,087
[45] Date of Patent: Jun. 20, 1989

[54] DIFFERENTIAL GEAR ASSEMBLY INCLUDING AT LEAST ONE INTEGRATED CONSTANT VELOCITY UNIVERSAL JOINT

[75] Inventors: Hans-Heinrich Welschof, Rodenbach; Rudolf Beier, Offenbach am Main, both of Fed. Rep. of Germany

[73] Assignee: Löhr & Bromkamp GmbH, Offenbach am Main, Fed. Rep. of Germany

[21] Appl. No.: 916,304

[22] Filed: Oct. 7, 1986

[30] Foreign Application Priority Data

Oct. 11, 1985 [DE] Fed. Rep. of Germany ....... 3536289

[51] Int. Cl.$^4$ ............................................. F16H 1/40
[52] U.S. Cl. ........................................ 74/713; 403/57
[58] Field of Search .............. 74/710, 713, 710.5, 74/711; 403/57, 318, 355

[56] References Cited

U.S. PATENT DOCUMENTS

| | | | |
|---|---|---|---|
| 1,324,861 | 12/1919 | Taylor | 74/713 X |
| 1,909,041 | 5/1933 | Burns | 74/713 |
| 2,187,843 | 1/1940 | Rzeppa | 74/713 X |
| 3,982,840 | 9/1976 | Grosseau | 403/57 X |

FOREIGN PATENT DOCUMENTS

| | | | |
|---|---|---|---|
| 676904 | 12/1963 | Canada | 74/710 |
| 1430907 | 3/1969 | Fed. Rep. of Germany | 74/710 |
| 2801114 | 6/1979 | Fed. Rep. of Germany | 403/57 |
| 936830 | 9/1963 | United Kingdom | 74/710.5 |

OTHER PUBLICATIONS

Austrian Reference of Anton Gazda dated Feb. 15, 1929, entitled (Pivotable Drive Shaft Particularly for Motor Vehicles) "Schwingbare Antriebsachse, iusbesondere für Kraftfahrzeuge".

Primary Examiner—Leslie A. Braun
Assistant Examiner—Dwight G. Diehl
Attorney, Agent, or Firm—Toren, McGeady & Associates

[57] ABSTRACT

A differential gear assembly wherein at least one constant velocity universal joint is integrated within the gear housing and wherein an outer joint member of the universal joint is designed as an outer bevel gear and is axially inwardly supported relative to the differential or planetary gears of the assembly and is outwardly supported relative to the differential carrier on a radial supporting face. The inner member of the joint is supported toward the outside on a counter face of the differential cage and/or toward the inside on a corresponding part of a second constant velocity universal joint or on a special supporting ring. Support of the joint inner part may be effected either directly or indirectly by means of a ball cage or a shaft journal, and the supporting ring is particularly suitable as a central supporting element if two constant velocity universal joints are integrated into the differential gear assembly.

18 Claims, 3 Drawing Sheets

DIFFERENTIAL GEAR ASSEMBLY INCLUDING AT LEAST ONE INTEGRATED CONSTANT VELOCITY UNIVERSAL JOINT

The present invention relates generally to differential gear assemblies and more particularly to a differential gear assembly having at least one constant velocity universal joint, particulary a fixed joint, which is integrated into the differential gear housing.

In assemblies of the type to which the present invention relates, the integrated universal joint comprises an inner joint member and an outer joint member with ball means which may include a cage member joining the inner and outer joint members together in torque transmitting engagement. The outer joint member may engage, either directly by means of teeth, or by means of an attached bevel gear or ring gear, the gears of the differential gear assembly.

Gears of this type are particularly suitable for the rear axle drive of a motor vehicle. However, such gears can also be used for coupling two driven axles. Usually, a differential gear is blocked onto a vehicle and is provided with shaft stubs which are connected to constant velocity universal joints, for example. The greater the distance between the center of the differential gear and the joint center of the constant velocity universal joints, the shorter is the possible length of the shafts and the greater will be the required joint angles. However, in order to increase service life of the joints and to reduce noise level, the joint angles should be kept as small as possible.

In order to achieve this objective, constant velocity universal joints integrated into a differential gear housing have already been designed. The disadvantage of such differential gear assemblies has been their generally complicated structure which causes a considerable increase in production costs. Furthermore, as compared to conventional differential gears having adjoining constant velocity joints, such gears have additional disadvantages from the point of view of their weight.

SUMMARY OF THE INVENTION

The present invention is directed toward providing an improved differential gear assembly of the type described wherein the axial distance between the gear center and the joint center is kept small while, at the same time, simplifying the design thereof and thus reducing production costs of the essential gear parts.

In accordance with the invention, the joint parts positioned inside the differential gear housing are provided with at least one sliding face which is supported in the gear inwardly in an axial direction reltive to the joint and/or outwardly on a counter face designed independently of the joint outer part.

In putting the inventive concept into effect, one of the joint parts positioned inside, i.e., the end of a shaft journal or of a ball hub possibly designed to be integral therewith or, additionally, a ball cage carried thereby, is supported with a respective sliding face in at least one direction on a counter face which is provided inside the differential carrier and which does not form part of the joint outer member. This support may be effected axially relative to the joint toward the inside and/or toward the outside relative to the differential center and, in consequence, a greatly simplified and shortened design of the joint outer part is achieved. It may be dish-shaped and undercut-free or it may be purely cylindrical and open at both ends while requiring that the joint parts positioned inside are embraced only partially in the axial direction. As a result, the overall joint size and the distance between the joint center and the differential center can be reduced. At least one of the supports of the inner joint member relative to the outer joint member usually provided in conventional fixed joints may be eleminated and it may be replaced by a support relative to another part which is either one of the parts regularly provided in a differential gear assembly or a special additional part. In the case of differential gears with two integrated constant velocity joints, it may be a corresponding part of the constant velocity joint arranged opposite.

As is usual with integrated joints, the outer joint member is designed as an output bevel gear which, toward the otuside, is supported on the differential carrier and which, toward the inside, is supported directly and exclusively on the gears with a sufficiently large clearance being provided in order to insure low noise and low wear during operation. In this way, the outer joint member is adapted to its integration with the differential housing and apart from the radial contact face, there is no need for axial securing means which enables axial fixing to be achieved exclusively by the assembly of the differential halves.

In the case of integrated joints, there is a choice of several designs, especially double offset joints (DO joints), Rzeppa fixed joints (RF joints) and undercut-free joints (UF joints). It also could be possible to use a tripod joint.

The shorter design of the outer joint member which is achieved by the direct axial support of one of the joint parts positioned inside relative to another design element is particularly advantageous in that it simplifies production. For example, the outer joint member may be manufactured as a simple, deep drawn part or as a punched part made of sheet or plate metal or it may be produced from bar or tubular stock broached inside. The simplified design is due to the elimination of interior supporting faces at the outer joint member which are usually required for axial support of the joint parts positioned inside.

If the joint parts positoned on the inside of the differential gear housing are supported independently of the outer joint member, exclusively toward the outside, the outer joint member has a dish-shaped, undercut-free design with a cylindrical outer face and a cylindrical inner face provided with grooves for guiding the balls. The support of the inner joint member toward the outside relative to the differential carrier can be effected indirectly by means of the ball cage.

If the support is independent of the outer joint member, both toward the inside and the outside, the inside and outside of the outer joint member, as a rule, are cylindrical, with the support of the joint parts positioned inside relative to the differential center usually being effected by a special supporting ring. In this case, also, support between the joint inner member and the supporting ring may be effected indirectly by means of the ball cage. To improve its sliding properties and to increase its wear resistance, such a supporting ring may be coated with plastic or it may be produced entirely from a wear-resistant plastic material. As a rule, however, it is manufactured as a simple, plate-metal ring.

If two constant velocity universal joints are integrated into the differential housing, the joint parts positioned inside and the ball cages of both of the CV joints may be supported at both ends on one and the same centrally arranged suporting ring in the differential carrier. However, with differential gears with two intergrated CV joints, even the aforementioned central supporting ring may be eliminated and the respective joint parts positioned inside, i.e., the shaft journals or the ball hubs of the joints may support each other directly. In such a case, the sliding face must be convex and especially spherical.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustratated and described the preferred embodiments of the invention.

DETAILED DESCRIPTION OF THE PREFERRED EMBODIMENTS

Figure 1:
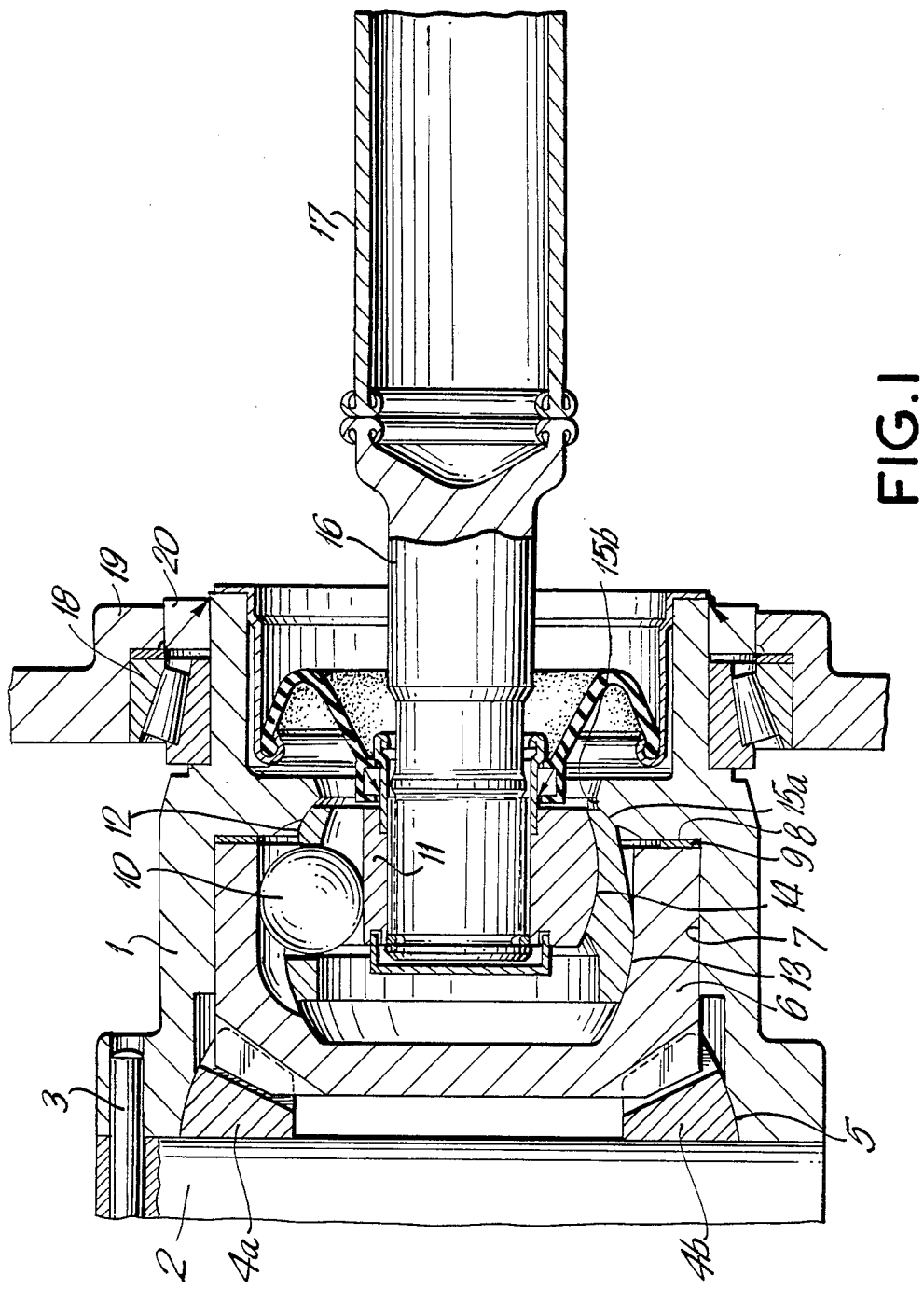
FIG. 1 is a sectional view showing a differential half with an integrated constant velocity universal joint having a ball cage which is supported on the outer joint member.

Referring now to FIG. 1, wherein a first embodiment of the invention is shown, there is depicted a differential gear assembly in accordance with the present invention and there is shown one half of a differential gear carrier or cage 1 in the center of which is a shaft journal 2 held by a fitting pin 3. The shaft journal 2 holds two differential or planetary gears 4a, 4b which, relative to the differential cage 1, have been provided with spherical sliding faces 5. The differential planetary gears engage an output bevel gear 6 which is guided in a cylindrical bore 7 of the differential cage and is supported axially outwardly on a radial face 8 of the latter. A sliding ring 9 serves to reduce frictional wear.

A constant velocity universal joint which is integrated into the gear assembly includes an inner joint member 11 which is connected in torque transmitting engagement with an outer joint member 6 by means of ball means including ball members 10. The ball members 10 are guided in a ball cage 12 which forms a spherical sliding face 13 together with the outer joint member and a spherical sliding face 14 together with the inner joint member, with the centers of the sliding faces 13 and 14 being axially offset in opposite directions relative to the center of the universal joint. The ball cage additionally is provided with a further external spherical sliding face 15a which is supported toward the outside on a counter face 15b in the differential cage. The inner joint member is connected by standard splines to a shaft journal 16 which is followed by a shaft 17.

Between the differential carrier 1 and the shaft journal 16 and the inner joint member, respectively, provision has been made for standard sealing means which are not shown in detail. The differential carrier 1 is held in a differential housing 19 by means of an angular roller bearing 18 and is sealed toward the exterior by means of a seal 20.

Figure 2:
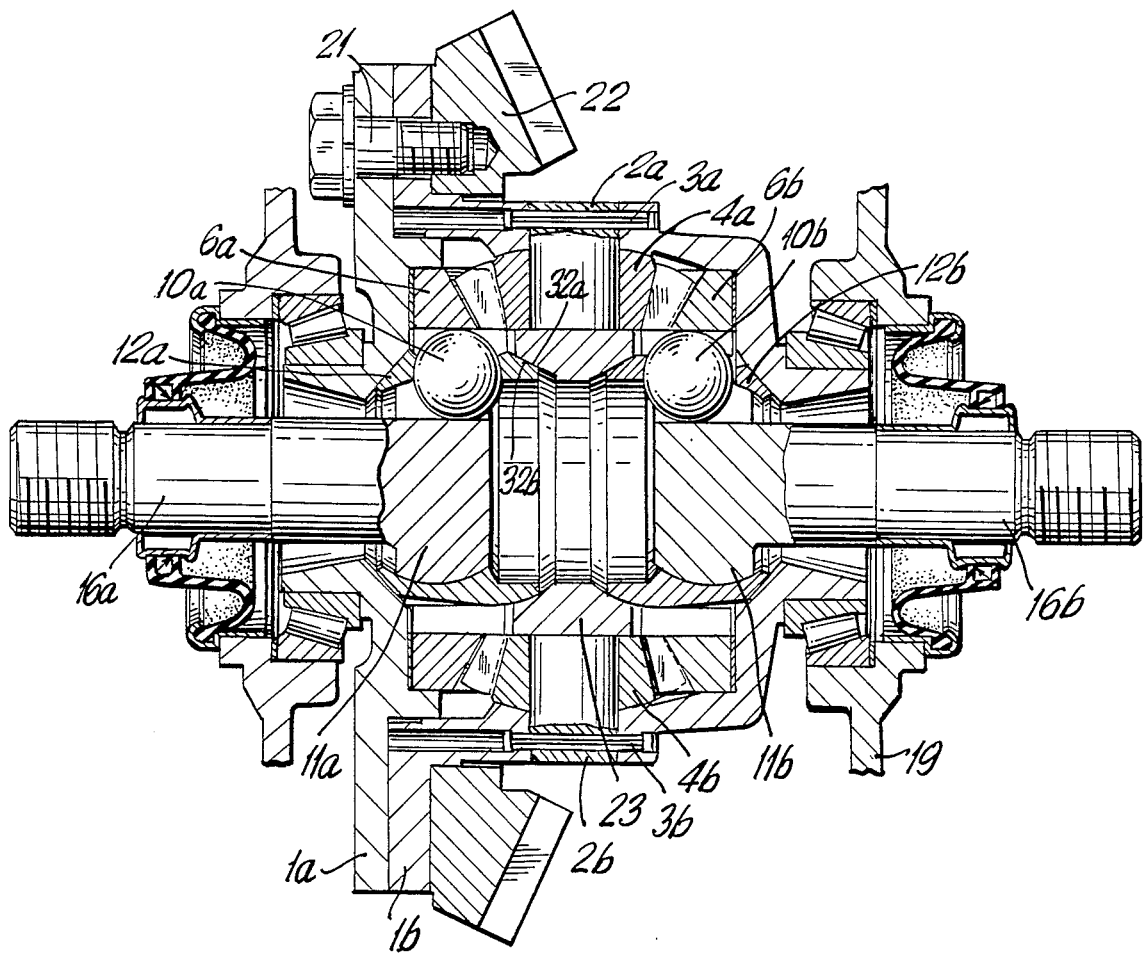
FIG. 2 is a sectional view showing a differential gear assembly with two integrated constant velocity universal joints having ball cages supported on a central supporting ring.

In a second embodiment of the invention shown in FIG. 2, the differential cage is composed of cage halves 1a, 1b with connecting bolts 21 simultaneously holding a crown wheel 22. In the differential cage, two shaft journals 2a, 2b are held by fitting pins 3a, 3b on which the differential bevel gears 4a, 4b rotate. The output bevel gears 6a 6b engaging the latter have been designed as a sleeve provided on the inside with a continuous cylindrical bore in which grooves for the ball members 10a, 10b are received and through which ball cages 12a, 12b partially project. The ball cages are supported with sliding faces 32a inwardly on counter faces 32b on a supporting ring 23 which, inside the shaft journal 2, is guided coaxially relative to the outer joint members 6 in the differential carrier. In the embodiment illustrted in FIG. 2, the inner joint members 11a, 11b are integral with the shaft journals 16a, 16b which are supported and sealed relative to the differential housing in the usual manner. Further details of the embodiment of FIG. 2 correspond with those of the embodiment in FIG. 1 and, thus, will not be repeated since similar parts are identified in FIG. 2 with the same reference numerals used in FIG. 1.

Figure 3:
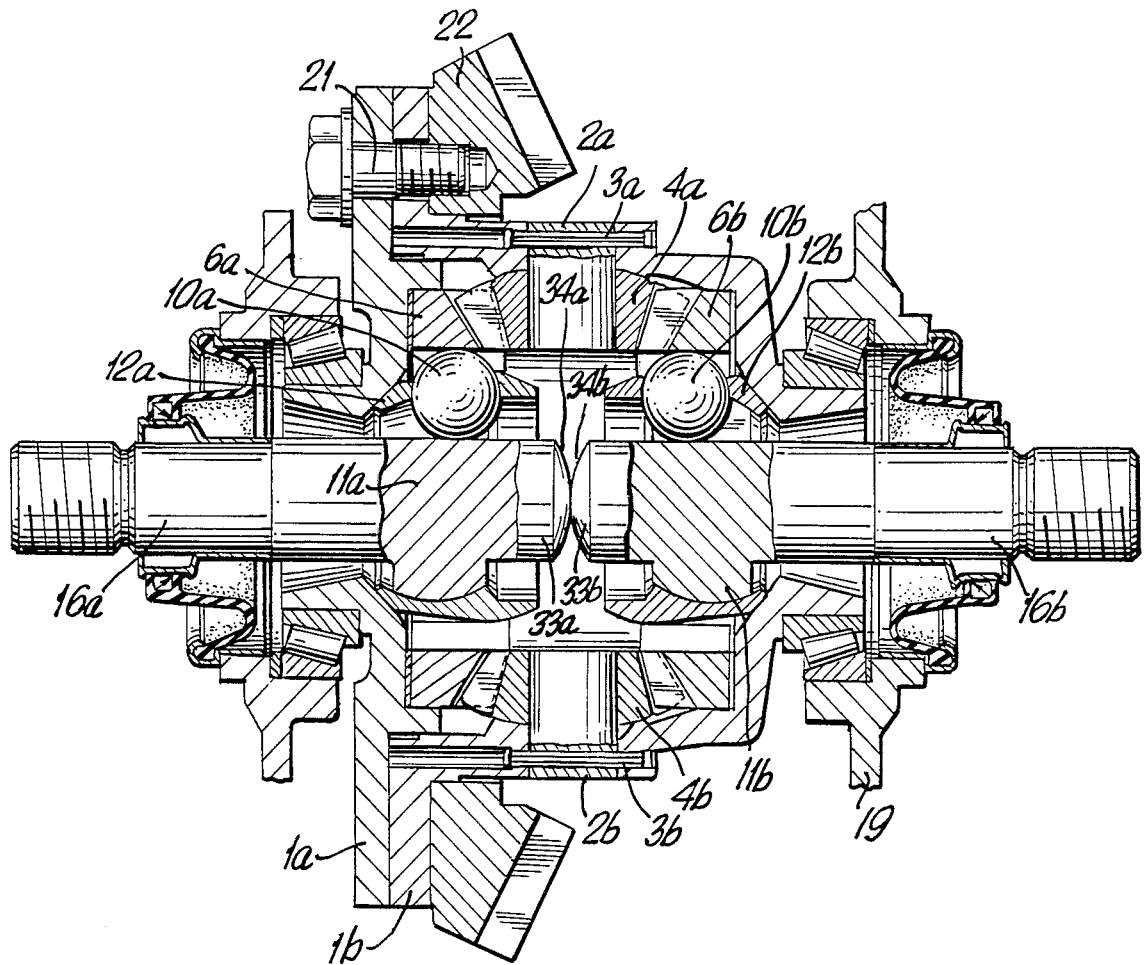
FIG. 3 is a sectional view illustrating a differential gear assembly with two integrated constant velocity universal joints whose shaft journals support each other directly.

FIG. 3 depicts a third embodiment of the invention comprising a differential gear assembly having a differential housing, wherein two constant velocity universal joints are accommodated symmetrically within the differential carrier 1. Two shaft journals 16a, 16b are integral with the ball hubs 11a, 11b which, through the balls 10a, 10b, engage undercut-free outer joint members 6a, 6b whose interior and exterior are of cylindrical design. The balls 10a, 10b are guided in ball cages 12a, 12b which, in the axial direction, extend at both ends beyond the outer joint members 6a, 6b. The ball hubs 11a, 11b are supported axially toward the otuside of the differential gear and indirectly by means of ball cages 12a, 12b on spherical sliding faces 15a relative to corresponding counter faces 15b in the differential carrier. Toward the joint center, the shaft journals 16a, 16b and the ball hubs 11a, 11b respectively support each other directly in the differential center by means of shaft projections ending in spherical surface parts 34a, 34b. Further details of the embodiment shown in FIG. 3 correspond to those of the embodiment in FIG. 2 and the same reference numerals are used to identify similar parts.

Accordingly, it will be seen that in accordance with the present invention, there is provided a differential gear assembly with which at least one constant velocity universal joint is integrated. The joint outer member of the constant velocity joint is designed as an outer bevel gear and axially inwardly is supported relative to the differential or planetary gears and is outwardly supported reltive to the differential carrier on a radial supporting face. The joint inner member is supported toward the outside on a counter face of the differential cage and/or toward the inside on a corresponding part of a second constant velocity universal joint or on a special supporting ring. Support of the inner joint member may be effected either directly or indirectly by means of a ball cage or by means of the shaft journal. The supporting ring is particularly suitable as a central supporting element if two constant velocity universal joints are to be integrated into the differential gear assembly.

While specific embodiments of the invention have been shown and described in detail to illustrate the application of the invention principles, it will be understood that the invention may be embodied otherwise without departing from such principles.

What is claimed is:

1. A differential gear assembly comprising: a differential gear housing; differential gear means; at least one constant velocity universal joint integrated within said gear housing, said universal joint including an inner joint member, an outer joint member, ball means joining said inner and outer joint members in torque transmitting engagement and shaft journal means engaging said inner joint member; and means for engaging said outer joint member with said differential gear means; wherein said inner joint member, said ball means and said shaft journal means of said universal joint positioned inside said housing are provided with at least one sliding face, said one sliding face being supported by one of an inwardly directed support and an outwardly directed support, said inwardly directed support being located axially inwardly in said housing relative to said joint and said outwardly directed support being on a counter face designed independently of said outer joint member; wherein one of said inner joint member and said shaft journal means is supported in the direction of a center of said differential gear assembly axially on sliding faces of a ring member which is held in a differential carrier and which is independent of said outer joint member.

2. An assembly according to claim 1, wherein said counter face is formed on a differential carrier.

3. An assembly according to claim 1, wherein said counter face is formed on said ring member held in a differential carrier.

4. An assembly according to claim 1, comprising a second constant velocity universal joint integrated into said differential gear housing wherein said counter face is formed on a corresponding symmetrical joint part positioned inside of said second universal joint.

5. An assembly according to claim 1, wherein said inner joint member is supported axially on a differential carrier by means of ball faces in the direction of the exterior of said differential gear assembly.

6. An assembly according to claim 5, wherein said inner joint member is supported axially indirectly by means of a ball cage of said ball means on said differential carrier in the direction of the exterior of said differential gear assembly.

7. An assembly according to claim 1, wherein one of said inner joint member and said shaft journal means is support indirectly by means of a ball cage of said ball means on said ring member.

8. An assembly according to claim 1, wherein said inner joint member is designed as a dish having an inside and/or on outside which is undercut-free, said inside being provided with grooves for ball members of said ball means and which axially partially embraces said inner joint member, a cage of said ball means and said shaft journal means positioned inside.

9. An assembly according to claim 1, wherein said outer joint member is designed as a sleeve having an inside and/or an outside which is cylindrical and an inner face interrupted by grooves for ball members of said ball means and which axially partially embraces said inner joint member, a ball cage of said ball means and said shaft journal means positioned inside.

10. An assembly according to claim 1, wherein said outer joint member is manufactured as a formed sheet metal part.

11. An assembly according to claim 1, wherein said ring member is manufactured as a punched sheet metal part.

12. An assembly according to claim 1, wherein said ring member has been subjected to one of a surface treatment and a plastic coating in order to improve its sliding properties and/or its wear resistance.

13. An assembly according to claim 1, wherein said ring member is manufactured completely of wear-resistant plastic.

14. A differential gear assembly comprising: a differential gear housing; differential gear means; two constant velocity universal joints integrated within said gear housing, each of said universal joints including an inner joint member, an outer joint member, ball means joining said inner and outer joint members in torque transmitting engagement and shaft journal means engaging said inner joint member; and means for engaging said outer joint member with said differential gear means; wherein said inner joint member, said ball means and said shaft journal means of said universal joint positioned inside said housing are provided with at least one sliding face, said one sliding face being supported by one of an inwardly directed support and an outwardly directed support, said inwardly directed support being located axially inwardly in said housing relative to said joint and said outwardly directed support being on a counter face designed independently of said outer joint member; wherein, for axial support of the inner joint member, a ball cage of the ball means and the shaft journal means of said two universal joints are positioned inside, a ring member having outwardly extending sliding faces located in the center of said differential gear assembly.

15. An assembly according to claim 14, wherein the inner joint members of said two universal joints or the shaft journal means thereof are supported indirectly by ball cages of said ball means on said ring member.

16. An assembly according to claim 14, wherein said ring member is formed as a punched sheet metal part.

17. An assembly according to claim 14, wherein said ring member has been subjected to one of a surface treatment and a platic coating in order to improve its sliding properties and/or its wear resistance.

18. An assembly according to claim 14, wherein said ring member is manufactured completely of wear-resistant plastic.

* * * * *